United States Patent
Sharma et al.

(10) Patent No.: US 11,036,621 B2
(45) Date of Patent: Jun. 15, 2021

(54) PREVENT APPLICATION OUTAGES THROUGH OPERATIONS DRIVEN DEVELOPMENT

(71) Applicant: International Business Machines Corporation, Armonk, NY (US)

(72) Inventors: Kalpesh Sharma, Vignan Nagar (IN); Hariharan N. Venkitachalam, Bengaluru (IN); Avinash Chandra, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/580,377

(22) Filed: Sep. 24, 2019

(65) Prior Publication Data

US 2021/0089432 A1    Mar. 25, 2021

(51) Int. Cl.
*G06F 11/36* (2006.01)
*G06F 11/34* (2006.01)
*G06N 20/00* (2019.01)

(52) U.S. Cl.
CPC ...... *G06F 11/3664* (2013.01); *G06F 11/3476* (2013.01); *G06F 11/3688* (2013.01); *G06N 20/00* (2019.01)

(58) Field of Classification Search
CPC ............. G06F 11/3664; G06F 11/3476; G06F 11/3688; G06N 20/00
See application file for complete search history.

(56) References Cited

U.S. PATENT DOCUMENTS

| 7,757,269 | B1 | 7/2010 | Roy-Chowdhury et al. |
| 8,074,119 | B1 | 12/2011 | Rao et al. |
| 8,756,576 | B2* | 6/2014 | Balasubramanian ........ G06F 11/3664 717/125 |
| 2008/0148248 | A1 | 6/2008 | Volkmer et al. |
| 2012/0042302 | A1* | 2/2012 | Sikandar ............ G06F 11/3688 717/125 |

(Continued)

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pages.

*Primary Examiner* — Wei Y Zhen
*Assistant Examiner* — Amir Soltanzadeh
(74) *Attorney, Agent, or Firm* — Peter Edwards

(57) ABSTRACT

A method, system, and computer program product to integrate service management tools with enterprise product development tools to determine Ops readiness scores. The method may include receiving one or more logs of bug tracking information from a client module, where the bug tracking information corresponds to one or more applications with one or more production bugs. The method may also include compiling the one or more logs. The method may also include receiving reports of at least Ops issues of the one or more applications and latest requirements of the one or more applications from a company module, where the latest requirements include at least current deliverables. The method may also include mapping the compiled one or more logs and the reports. The method may also include generating an Ops readiness score for each of the current deliverables, based on the mapping.

13 Claims, 7 Drawing Sheets

(56) References Cited

U.S. PATENT DOCUMENTS

| | | | |
|---|---|---|---|
| 2013/0061202 A1* | 3/2013 | Nema | G06F 8/70 717/101 |
| 2015/0019564 A1* | 1/2015 | Higginson | H04L 43/04 707/748 |
| 2015/0025942 A1* | 1/2015 | Ross | G06Q 10/06393 705/7.39 |
| 2015/0082277 A1* | 3/2015 | Champlin-Scharff | G06F 11/368 717/120 |
| 2017/0091071 A1 | 3/2017 | Chitale et al. | |
| 2018/0121317 A1* | 5/2018 | Ekambaram | G06F 11/3616 |
| 2018/0275986 A1 | 9/2018 | Ghosh et al. | |
| 2018/0276103 A1 | 9/2018 | Woulfe et al. | |
| 2019/0004925 A1 | 1/2019 | Buckingham et al. | |
| 2019/0163594 A1* | 5/2019 | Hayden | G06F 11/2257 |
| 2019/0243644 A1* | 8/2019 | Jose | G06Q 10/06311 |
| 2019/0294528 A1* | 9/2019 | Avisror | G06F 8/60 |

* cited by examiner

PREVENT APPLICATION OUTAGES THROUGH OPERATIONS DRIVEN DEVELOPMENT

BACKGROUND

The present disclosure relates to debugging applications, and more specifically to preventing application outages and providing proactive remediation by integrating service management tools with enterprise product development tools to determine operational (Ops) readiness scores for each deliverable ready for production.

SUMMARY

The present disclosure provides a computer-implemented method, system, and computer program product to integrate service management tools with enterprise product development tools to determine Ops readiness scores. According to some embodiments of the present disclosure, the method may include receiving one or more logs of bug tracking information from a client module, where the bug tracking information corresponds to one or more applications with one or more production bugs. The method may also include compiling the one or more logs. The method may also include receiving reports of at least Ops issues of the one or more applications and latest requirements of the one or more applications from a company module, where the latest requirements include at least current deliverables. The method may also include mapping the compiled one or more logs and the reports. The method may also include generating an Ops readiness score for each of the current deliverables, based on the mapping.

The system may have one or more computer processors and may be configured to receive one or more logs of bug tracking information from a client module, where the bug tracking information corresponds to one or more applications with one or more production bugs. The system may also be configured to compile the one or more logs. The system may also be configured to receive reports of at least Ops issues of the one or more applications and latest requirements of the one or more applications from a company module, where the latest requirements include at least current deliverables. The system may also be configured to map the compiled one or more logs and the reports. The system may also be configured to generate an Ops readiness score for each of the current deliverables, based on the mapping.

The computer program product may include a computer readable storage medium having program instructions embodied therewith, the program instructions executable by a server to cause the server to perform a method. The method may include receiving one or more logs of bug tracking information from a client module, where the bug tracking information corresponds to one or more applications with one or more production bugs. The method may also include compiling the one or more logs. The method may also include receiving reports of at least Ops issues of the one or more applications and latest requirements of the one or more applications from a company module, where the latest requirements include at least current deliverables. The method may also include mapping the compiled one or more logs and the reports. The method may also include generating an Ops readiness score for each of the current deliverables, based on the mapping.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
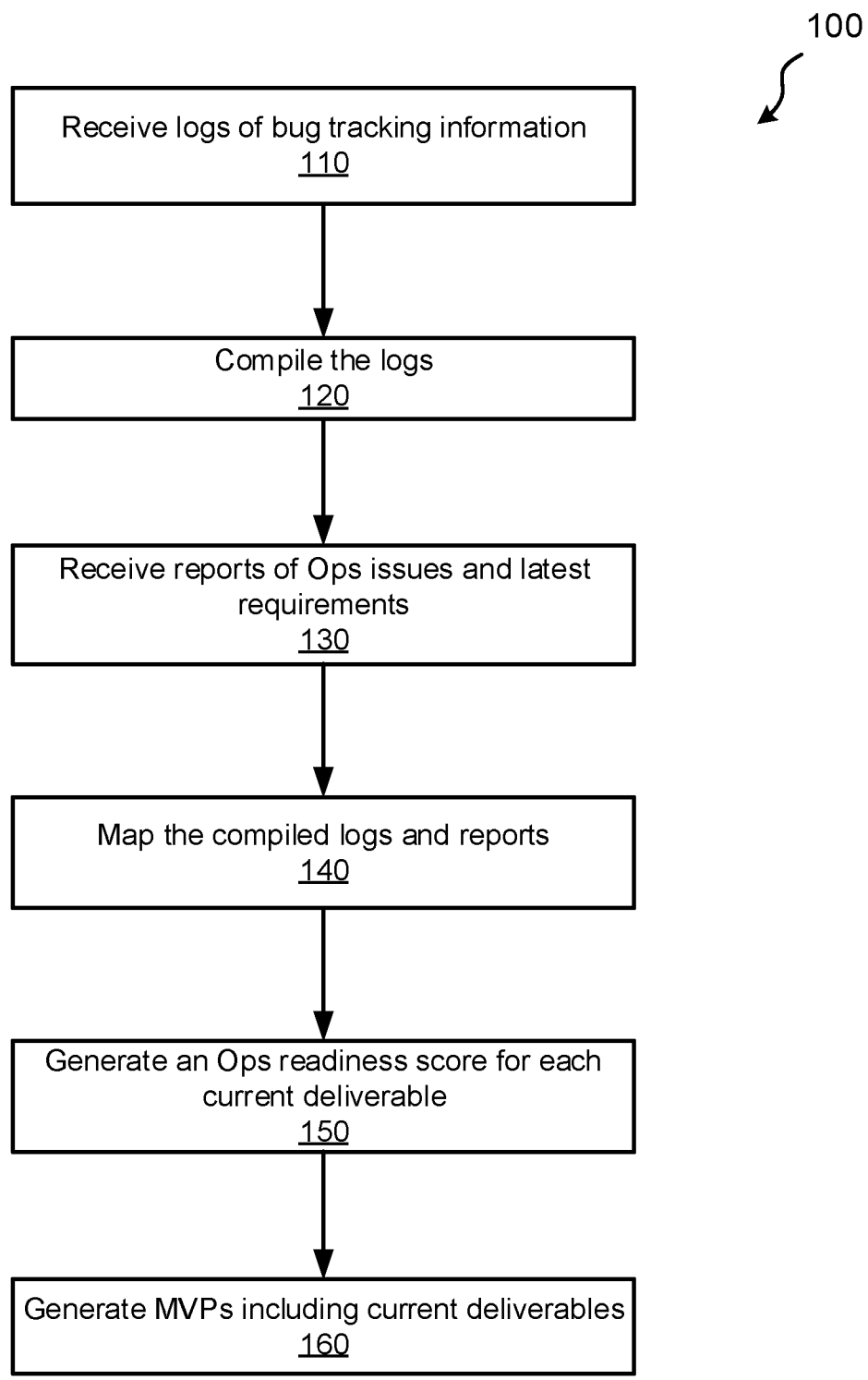
FIG. 1 depicts a flowchart of a set of operations for integrating service management tools with enterprise product development tools to determine Ops readiness scores, according to some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present disclosure relates to debugging applications, and more specifically to preventing application outages and providing proactive remediation by integrating service management tools with enterprise product development tools to determine Ops readiness scores for each deliverable ready for production. While the present disclosure is not necessarily limited to such applications, various aspects of the disclosure may be appreciated through a discussion of various examples using this context.

When applications, and programs relating to the applications, are being used by a business, or client, the client may focus on enterprise product development, and may drive the release requirements related to the application. Sponsored users or stakeholders may focus on building new features and maintaining competition. Additionally, the company developing and providing the application may focus on the service management (e.g., maintaining, designing, operating, etc.) of the application(s), but, as discussed above, the release requirements (e.g., release of services) may be driven by the client. Because of these various focuses, the actual incidents and problems of the application may be assigned a low priority in development organizations, and therefore operations of the application may be negatively affected.

This may result in a lower quality (e.g., a low Ops readiness score) of service, of serviceability, and of service-level agreements (SLAs).

In some instances, because of the split focus of the various parties, manual intervention may be used to fix problems with the application(s). But, these manual interventions, including hotfixes and minor releases, may be time consuming. Further, manual intervention may delay the deployment of fixes that have been tested and established by development teams (for example, involved in service management).

To help reduce the split focus of the various parties, development activities (e.g., service management) may be led by product backlog, and product managers may gather user requirements, convert the requirements to user stories, and put the user stories in a backlog. But these development activities may remain disconnected from the needs of the operations (Ops) team. The Ops team may also be part of the service management team, in some embodiments, but may be a separate group in the service management team than the development group. In some instances, backlogs may be prioritized by production/offering managers (for example, on the client side) and stakeholders, but the production managers, and stakeholders, may prioritize user stories (for example, that were converted from requirements) and the business value of the application(s), and may not prioritize Ops driven issues (e.g., debugging, updating, etc.). The Ops team may want to prioritize Ops driven issues and may not want to prioritize the business value of the application. Because of the disconnect between the Ops team and the production managers (and stakeholders), the necessary fixes and/or development to the application may not be executed and/or may not be executed efficiently. Therefore, the quality of service may still be a problem.

The present disclosure provides a computer-implemented method, system, and computer program product to integrate service management tools with enterprise product development tools to determine Ops readiness scores. In some instances, production bugs may be identified in production (on the client side) using various resources (e.g., continuous monitoring tools, user feedback, etc.). Production bugs may be bugs (such as errors, failures, etc.) that are found in production (in other words, after the application/software is released and in use). In other words, production bugs may be existing defects, or existing features causing defects, with the application/software. The identified production bugs may be stored in a bug tracking system. Additionally, development and operations data (e.g., sprint stories, backlog, other problems, latest requirements, etc.) may be tracked by the company developing and maintaining the application(s). In some instances, the development and operations data is development input that comes from operations as a new product feature to be implemented or a possible defect that has been predicted. The possible defect may be flagged to be fixed before the defect has actually occurred or been found. Reports may be generated of the development and operations data, and these reports may be mapped to the identified production bugs, or compiled logs of the identified production bugs. In some embodiments, the mapping may then be used to calculate, or generate, Ops readiness scores for any deliverables (for the application). Deliverables, as referred to herein, are any software updates, changes, fixes, etc. that will be (or are planned to be) applied to the applications. In some instances, the deliverables include deliverables that are currently production ready, under development, under testing, etc.

In some embodiments, deliverables include software that is to be delivered/deployed in order to update/maintain the application. The deliverables, in some embodiments, may be determined using the development and operations data. In some embodiments, Ops readiness scores are scores (e.g., numbers, percentages, etc.) that indicate a readiness, or the capability, of a deliverable to perform its designated function.

In some instances, candidate minimum viable products (MVPs) may be generated (for example, using the Ops readiness scores) using the deliverables. MVPs may be products that include just enough features to achieve the designated function (for example, to resolve/eliminate problems with the application(s)). The MVPs may be forwarded on to stakeholders, in some embodiments, for approval. Based on the approvals, a build of the MVPs, or at least an MVP, may be triggered and the MVP(s) may be deployed, tested, and then pushed into production. Problems, or the deliverables corresponding to the problems, that were not included in the MVP(s) may be recommended as backlog content, possibly prioritized backlog content.

Figure 5:
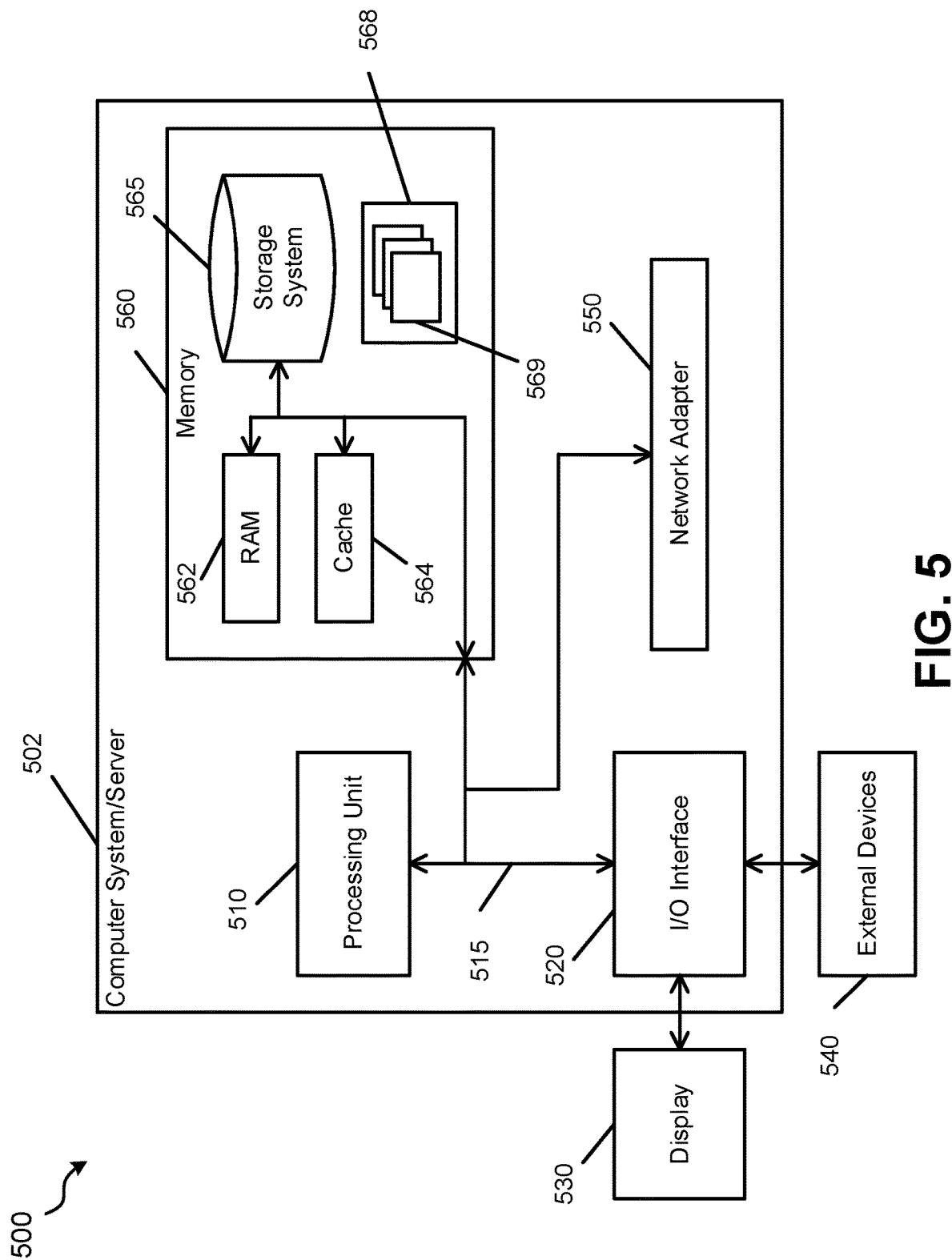
FIG. 5 depicts a block diagram of a sample computer system, according to some embodiments.

Referring now to FIG. 1, a flowchart illustrating a method 100 for integrating service management tools with enterprise product development tools to determine Ops readiness scores is depicted, according to some embodiments. In some embodiments, method 100 is implemented as a computer script or computer program (e.g., computer executable code) to be executed by a server on or connected to a computer system (e.g., computer system 500 (FIG. 5)). In some embodiments, the server is a computer device, such as computer system/server 502 (FIG. 5). In some embodiments, method 100 is executed by a node (e.g., computing nodes 10 (FIG. 6)) within a cloud computing environment (e.g., cloud computing environment 50 (FIG. 6)).

Method 100 includes operation 110 to receive one or more logs of bug tracking information. In some embodiments, the logs may be received from a client server, or a client module. An application, or a site corresponding to one or more applications, may be monitored at the client premises (e.g., a client server). The application(s) may be monitored for problems such as production bugs. Production bugs may be existing defects, or existing features that cause defects, that occur in production. The monitoring may be logged, in some embodiments. In some embodiments, the bug tracking information may correspond to one or more applications with one or more production bugs. For example, an application, or a site (with one or more applications) may be identified as having one or more production bugs. The information relating to the monitoring for problems, as well as, in some embodiments, the identified production bugs themselves, may be stored as logs of bug tracking information. In some embodiments, the bug tracking information includes at least one of continuous monitoring tool data and user feedback data. When monitoring, continuous monitoring tool data and/or user feedback data may be used to help identify possible production bugs.

Method 100 includes operation 120 to compile the one or more logs. In some embodiments, compiling the one or more logs includes translating the logs from their source language into a target language (e.g., a lower level language). In some embodiments, compiling the one or more logs may include grouping logs from the one or more logs together based on similarities. In some embodiments, the logs may be compiled based on the production bug, or problem. For example, the logs may be compiled into compiled logs "internal server error occurred," "page not found," and "search results not found." In some embodiments, the compiling is executed using a machine learning algorithm that may be, for example, created and trained by an OpsDev server, such as OpsDev 230 (FIG. 2) and/or OpsDev 300 (FIG. 3).

Method 100 includes operation 130 to receive reports of Ops issues and the latest requirements. Specifically, reports may be received of at least Ops issues of the one or more applications and latest requirements of the one or more applications. In some embodiments, the Ops team and/or development team may have various deliverables to execute in order to maintain and/or update the one or more applications. To determine these deliverables, the Ops and/or development teams may track various data regarding the applications. For example, the Ops team may have Ops issues for the application that it is tracking. Ops issues may be possible defects that have been predicted, from operations, before the defect has actually occurred or been found. In another example, the development team may track the latest requirements (e.g., updates, standards, policies, etc.) of the application. In some instances, the latest requirements include new product features that are going to be implemented, but have not yet been implemented.

In some embodiments, the Ops and/or development teams may be implemented on a company module/server. Therefore, the reports may be received from a company module. In some embodiments, the latest requirements include at least current deliverables. The Ops issues and the latest requirements may correspond to one or more deliverables, that, when executed/deployed, may fix the Ops issues and implement the latest requirements, in some embodiments. In some embodiments, the reports are in the form of one or more tables.

Method 100 includes operation 140 to map the compiled one or more logs and the reports. Mapping may include linking the compiled one or more logs (for example, based on error message) to the reports. In some embodiments, the compiled logs may be linked to the one or more deliverables included in the reports. In some embodiments, the mapping is executed using a machine learning algorithm (for example, created and trained by an OpsDev server, such as OpsDev 230 (FIG. 2) and/or OpsDev 300 (FIG. 3)). Mapping the compiled one or more logs and the reports is further discussed herein and depicted in FIG. 3 (for example, mapper 320).

Method 100 includes operation 150 to generate an Ops readiness score for each of the current deliverables. In some embodiments, the generating is based on the mapping (for example, in operation 140). In some embodiments, the reports, as discussed herein, may include the one or more deliverables. In some embodiments, generating Ops readiness scores may include determining a priority of each of the current deliverables. In some embodiments, the priority is determined based on the reports (along with the Ops issues and latest requirements) and the mapping. In some embodiments, the reports include a priority of each of the current deliverables, which may be based on the Ops issues and latest requirements.

In some embodiments, generating an Ops readiness score for each of the current deliverables includes weighting the priority of each of the current deliverables and a status of each of the current deliverables. In some embodiments, the status indicates whether there are any problems with the current deliverables. For example, statuses may include closed, new, invalid, etc. In this example, a closed status may indicate that any problems with the corresponding deliverable is closed/resolved, and there are currently no problems. Continuing the example, a new status may indicate that the deliverable has a new problem. Additionally, in this example, an invalid status may indicate that the deliverable is invalid until the problem is resolved. In some instances, the new and invalid statuses may be combined into a single open status, indicating that there is an open problem that has not yet been resolved.

In some embodiments, generating the Ops readiness score may further include weighting problem descriptions/dependencies along with the priority of each of the current deliverables and the status of each deliverable. Problem descriptions/dependencies are further discussed herein and depicted in FIG. 3.

In some embodiments, the Ops readiness score for one or more of the current deliverables may be transmitted to one or more stakeholders. The stakeholders may then review the Ops readiness score(s) for each deliverable (i.e., a readiness review). In some embodiments, the readiness review may include an agreement, or disagreement, with the readiness of each deliverable (i.e., as indicated by the readiness score). In some embodiments, the readiness reviews may include a ranking of the readiness, or order in which the deliverables should be released/deployed. The readiness reviews for the one or more current deliverables may be received (for example, by OpsDev server 230 (FIG. 2)) from the one or more stakeholders.

In some embodiments, release content of the one or more current deliverables may be determined based on the readiness reviews. The release content may include at least a priority of which of the one or more current deliverables to release. In some embodiments, the release content includes a ranking of the one or more current deliverables in order of priority.

Method 100 includes operation 160 to generate, or calculate, one or more minimum viable products (MVPs) that may include one or more of the current deliverables. As discussed herein, MVPs may be products that include just enough features to achieve the designated function (for example, to eliminate problems with the application(s)). In some embodiments, a single MVP is generated. In some embodiments, a plurality of MVPs may be generated. The plurality of MVPs may be labeled, or possibly released, in order of strength, or priority. For example, the most minimal VP (for instance, with the least deliverables) may be the highest priority (e.g., first) MVP.

In some embodiments, when the Ops readiness scores are sent to the stakeholders, an MVP may be generated based on the Ops readiness score and release content (discussed herein). In some embodiments, the one or more MVPs are generated using the Ops readiness score. For instance, generating the one or more MVPs may include determining whether each of the one or more current deliverables has any open dependencies. Open dependencies may include any open problems that have not been resolved for the corresponding deliverable. Generating the one or more MVPs may further include removing any deliverables from the one or more current deliverables with open dependencies from consideration. In some instances, deliverables that have open problems may not be included as part of the MVP(s). In some embodiments, generating the one or more MVPs includes selecting, from a remaining one or more deliverables, the one or more deliverables with a corresponding Ops readiness score indicating high readiness. In some instances, only the deliverables with the highest readiness (as indicated by the Ops readiness score) may be selected as part of the MVP(s). In some instances, deliverables with either moderately high readiness, high readiness, or both, along with the highest readiness may be selected as part of the MVP(s). In some embodiments, the one or more MVPs are generated including at least the selected one or more deliverables.

In some embodiments, once the one or more MVPs are generated, the MVPs may be transmitted to the one or more stakeholders. The stakeholders may then review the one or more MVPs to determine whether or not they approve each MVP. In some embodiments, one or more approvals of the one or more MVPs may be received from the one or more stakeholders. The stakeholders may approve any (or none) of the MVPs. In some embodiments, at least one of the one or more MVPs is deployed based on the one or more approvals. For example, all MVPs that were approved by the one or more stakeholders may be deployed. In some embodiments, the one or more MVPs are deployed using at least one of continuous integration, continuous delivery, continuous testing, other DevOps tools, or any combination thereof. Various DevOps tools may be utilized to deploy the MVPs.

Figure 2:
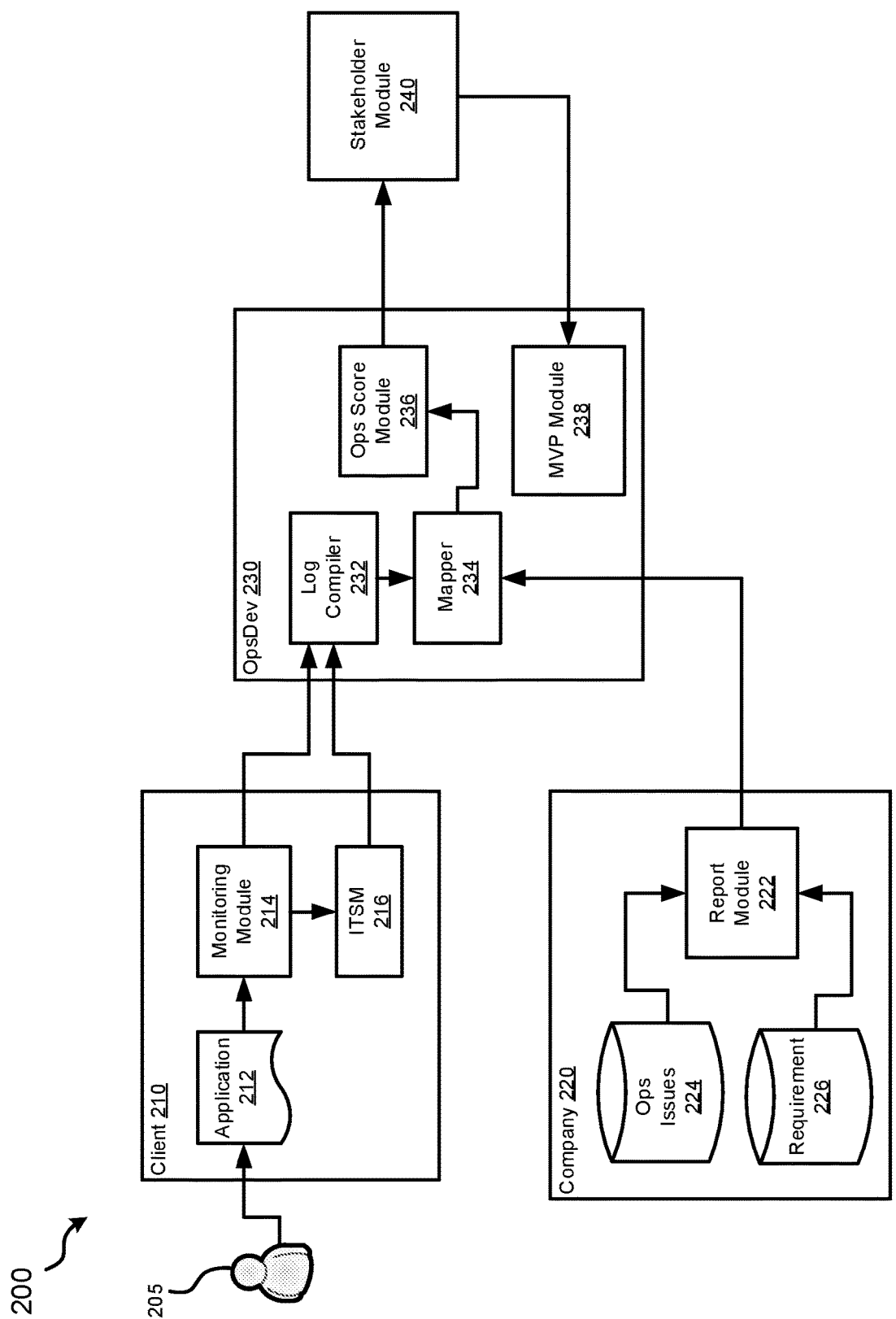
FIG. 2 depicts a schematic diagram of an example system that integrates service management tools with enterprise product development tools, according to some embodiments.
Figure 3:
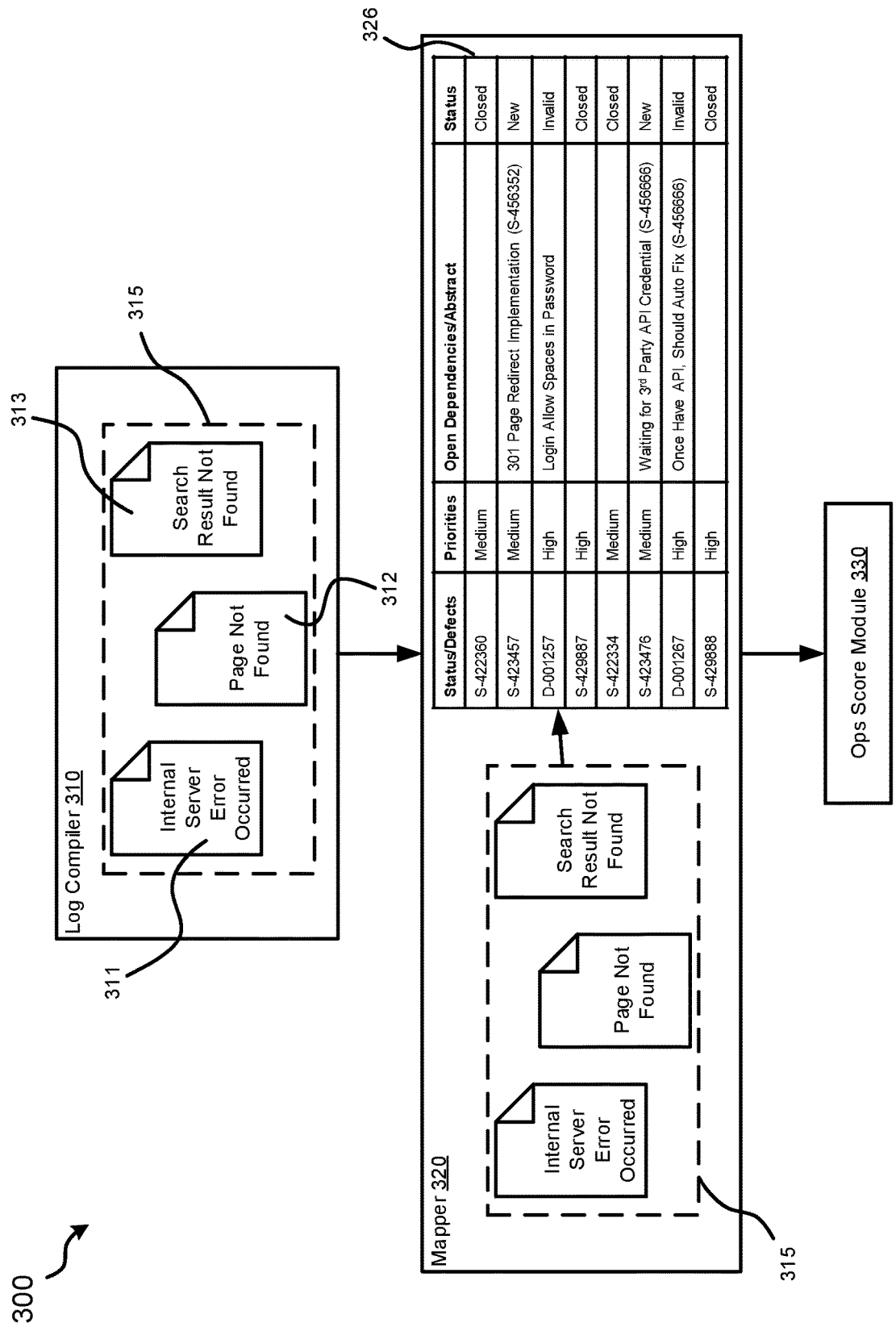
FIG. 3 depicts a schematic diagram of sample components of an OpsDev module, according to some embodiments.

Referring to FIG. 2, a schematic diagram of an example system 200 that integrates service management tools with enterprise product development tools is depicted, according to some embodiments. In some embodiments, system 200 includes a client server 210, a company server 220, and an OpsDev server 230. In some embodiments, client server 210, company server 220, and OpsDev server 230 are connected via the cloud (e.g., cloud computing environment 50 (FIG. 6)). In some embodiments, OpsDev 230 executes method 100 (FIG. 1).

In some embodiments, a user 205, or a plurality of users, accesses application 212. For example, one or more users may visit a site, the site corresponding to an application 212. The application may be monitored via monitoring module 214 within the client premises (i.e., client server 210). In some embodiments, production bugs or problems that have been determined based on the monitoring may be collected by IT service management (ITSM) 216. Logs of the monitoring (from monitoring module 214) and logs of the production bugs/problems (from ITSM 216) may be sent to the log compiler 232 within OpsDev server 230. Log compiler 232 may compile the logs.

In some embodiments, data about any Ops issues (Ops issue data) 224 corresponding to application 212 as well as data regarding any requirements (requirements data) 226 for application 212 may be analyzed and generated into a report via report module 222. In some embodiments, Ops issue data 224, requirements data 226, and report module 222, are all part of company server 220. In some embodiments, company server 220 corresponds to a company that develops and operates application 212.

In some embodiments, report module 220 may transmit any relevant reports to mapper 234. Log compiler 232 may transmit the compiled logs to mapper 234. In some embodiments, mapper 234 maps the compiled logs to the reports. The mapped logs/reports may be transmitted to Ops score module 236 where the Ops readiness score for each current deliverable corresponding to application 212 may be generated, or calculated.

In some embodiments, the Ops score module 236 may transmit the generated Ops readiness scores to the MVP module 238 so the MVP module 238 can generate one or more MVPs.

In some embodiments, the Ops score module 236 may transmit the generated Ops readiness scores to stakeholder module 240. Stakeholder module 240 may be accessible by the one or more stakeholders. In some embodiments, as discussed herein, the stakeholders may review the Ops readiness scores. The stakeholder module 240 may transmit those reviews back to OpsDev 230, and more specifically to MVP module 238, where the one or more MVPs may be generated based on the reviews and the Ops readiness scores.

For example, a client server 210, or a user 205 corresponding to client server 210, may login to a site of company 220. The user 205 may attempt to click a link on the site, but the link may be found broken, as the webpage has been re-innovated/changed, and the user 205 may be directed to a "404 not found" page/error message. This incident may be monitored via monitoring module 214 and logged in the ITSM tool 216. Additionally, on the company side (i.e., corresponding to company server 220), code that is to be released may be under development, and the data (e.g., stories) corresponding to the code may be in report module 222. The reports corresponding to the code may be fed into the OpsDev 230 system/server, and more specifically the mapper 234, where the reports may be mapped with the log discussed above. In this example, the Ops readiness score for the code will be computed in Ops score module 236 and will be circulated for further voting and review by other stakeholders via stakeholder module 240. An MVP for the code may be generated via MVP module 238 using the voting/review by the stakeholders.

Referring to FIG. 3, a schematic diagram of sample components of an OpsDev module 300 is depicted, according to some embodiments. In some embodiments, OpsDev module 300 may execute method 100 (FIG. 1). In some embodiments, OpsDev module 300, or OpsDev server, may correspond with OpsDev 230 (FIG. 2). OpsDev module 300 may include a log compiler 310, a mapper 320, and an Ops score module 330. In some embodiments, log compiler 310 corresponds to log compiler 232 (FIG. 2), mapper 320 corresponds to mapper 234 (FIG. 2), and Ops score module 330 corresponds to Ops score module 236 (FIG. 2).

In some embodiments, log compiler 310 may compile bug 311, bug 312, and bug 313 into compiled logs 315. The compiled logs may include bug 311 "internal server error occurred," bug 312 "page not found," and bug 313 "search results not found." In some embodiments, there are multiple cases/incidents of each bug 311, 312, and 313, and the multiple cases have been compiled based on the bug. Bug 311, bug 312, and bug 313 may be production bugs. In some embodiments, the compiled logs 315 are transmitted to mapper 320.

Mapper 320 may then map the compiled logs 315 to the report 326. In some embodiments, report 326 may include status/defects, priorities of resolving the corresponding status/defects, the open dependencies/abstract of the corresponding status/defects, and the status of the corresponding status/defects.

The status/defect column may include identifiers corresponding to defects, problems, updates, fixes, etc. that the developers may be working on. The letter (i.e., S or D, may indicate whether it is a status or a defect). In some embodiments, status, or S, may indicate that the problem, update, fix, etc. is fixable (for example, it can be fixed, is in the process of being fixed, has already been fixed, etc.). Defect, or D, may indicate that a defect, problem, etc. is not fixable (or nothing can be done to fix the problem). Each status/defect may correspond to a deliverable. Each defect, problem, update, fix, etc. may have corresponding software/code that is in place, or is being worked on, in order to implement or correct the status/defect.

The priorities column may include a level of priority (e.g., high, medium, low, etc.) that indicates how necessary it is to resolve, or implement, the status/defect. The open dependencies/abstract column may include any notes about the status/defects, including at least an indication of whether or not the status/defect is dependent on another factor. For instance, the status/defect, or the deliverable corresponding to the status/defect, may not be able to be resolved or implemented until a dependency is resolved. In some embodiments, not every deliverable, or status/defect, has any open dependencies. The status column may indicate the actual status of the corresponding status/defect.

For example, S-423457 may be an identifier that corresponds with an update to an application. The application may have been moved from page A (on a cite) to page B, in this example. The report 326 shows that this update has a medium priority in the priorities column. Additionally, report 326 shows that there is an open dependency "301 page redirect implementation (S-456352)." In this example, because the application has been moved from page A to page B, the update to the application on page B may not be able to occur until the page redirect has been implemented. This page redirect may correspond to a status S-456352. Additionally, the update to the application (corresponding to identifier S-423457) may be new, as indicated in the status column.

In some embodiments, once the compiled logs 315 are mapped to the report 326, the mapping is transmitted to Ops score module 330. The Ops score module 330 is further discussed herein and depicted in FIG. 4.

Figure 4:
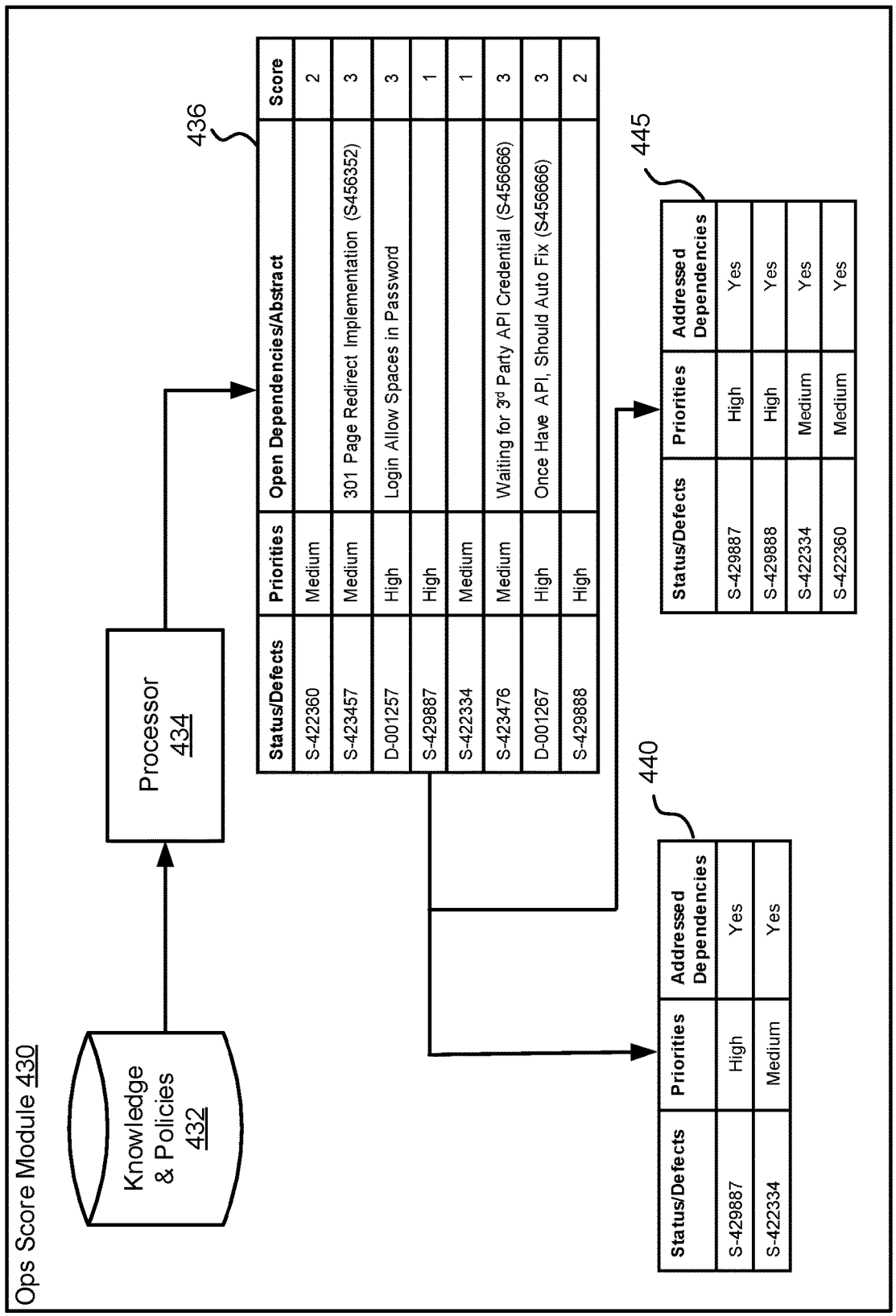
FIG. 4 depicts a schematic diagram of an Ops score module, according to some embodiments.

Referring to FIG. 4, a schematic diagram of an Ops score module 430 is depicted, according to some embodiments. Ops score module 430 may correspond to Ops score module 330 (FIG. 3), in some embodiments.

In some embodiments, Ops score module 430 inputs knowledge and policies data 432 into a processor to determine the Ops readiness scores. In some embodiments, the mapped report is also inputted into processor 434. The Ops readiness scores may be added to the mapped report to generate an Ops score report 436, in some embodiments. In this example Ops score report 436, the Ops readiness scores may be interpreted as 1 being the must content for any MVPs, 2 being the good to have content for any MVPs, and 3 being the content to prioritize in product backlog. In some embodiments, any type of scoring may be used for the Ops readiness score. For example, the Ops readiness scores may be scores 1-10 indicating most ready to least ready, respectively (or vice versa). In another example, the Ops readiness scores may be percentages indicating readiness.

In some embodiments, the Ops score report 436 may be used to generate MVP 440 and MVP 445. MVP 440 may include only the most ready deliverables (e.g., the deliverables with the score of 1). MVP 445 may include the most ready deliverables along with the ready deliverables (e.g., the deliverables with both scores of 1 and 2). In some embodiments, MVP 400 is the better MVP because it has the least number of status/defects (e.g., S-429887 and S-422334), which may result in the least number of deliverables (as the status/defects may correspond to deliverables).

Referring now to FIG. 5, computer system 500 is a computer system/server 502 is shown in the form of a general-purpose computing device, according to some embodiments. In some embodiments, computer system/server 502 is located on the linking device. In some embodiments, computer system 502 is connected to the linking device. The components of computer system/server 502 may include, but are not limited to, one or more processors or processing units 510, a system memory 560, and a bus 515 that couples various system components including system memory 560 to processor 510.

Bus 515 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media.

System memory 560 can include computer system readable media in the form of volatile memory, such as random-access memory (RAM) 562 and/or cache memory 564. Computer system/server 502 may further include other removable/non-removable, volatile/non-volatile computer system storage media. By way of example only, storage system 565 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 515 by one or more data media interfaces. As will be further depicted and described below, memory 560 may include at least one program product having a set (e.g., at least one) of program modules that are configured to carry out the functions of embodiments of the disclosure.

Program/utility 568, having a set (at least one) of program modules 569, may be stored in memory 560 by way of example, and not limitation, as well as an operating system, one or more application programs, other program modules, and program data. Each of the operating system, one or more application programs, other program modules, and program data or some combination thereof, may include an implementation of a networking environment. Program modules 569 generally carry out the functions and/or methodologies of embodiments of the invention as described herein.

Computer system/server 502 may also communicate with one or more external devices 540 such as a keyboard, a pointing device, a display 530, etc.; one or more devices that enable a user to interact with computer system/server 502; and/or any devices (e.g., network card, modem, etc.) that enable computer system/server 502 to communicate with one or more other computing devices. Such communication can occur via Input/Output (I/O) interfaces 520. Still yet, computer system/server 502 can communicate with one or more networks such as a local area network (LAN), a general wide area network (WAN), and/or a public network (e.g., the Internet) via network adapter 550. As depicted, network adapter 550 communicates with the other components of computer system/server 502 via bus 515. It should be understood that although not shown, other hardware and/or software components could be used in conjunction with computer system/server 502. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
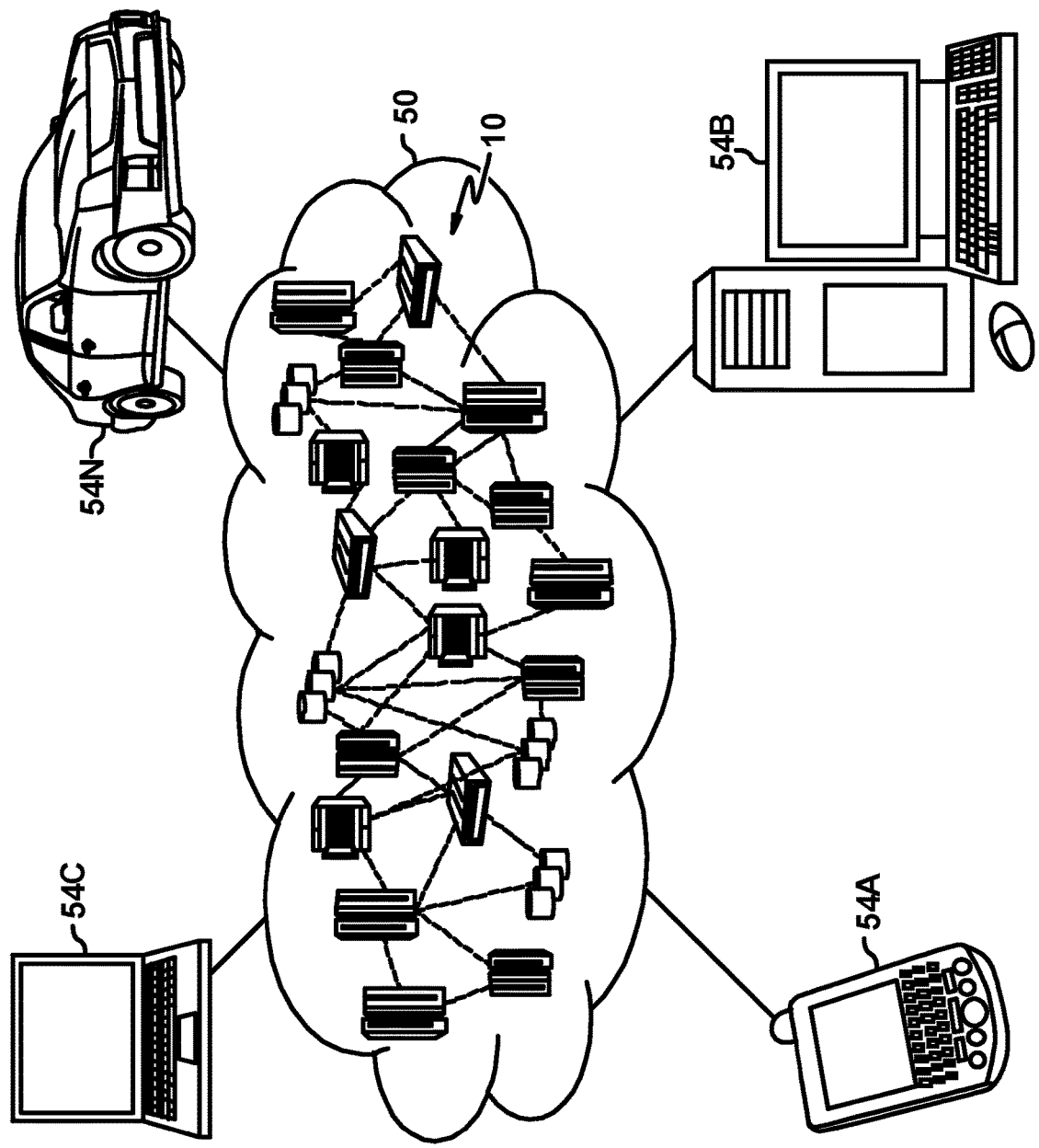
FIG. 6 depicts a cloud computing environment, according to some embodiments.

Referring now to FIG. 6, illustrative cloud computing environment 50 is depicted, according to some embodiments. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
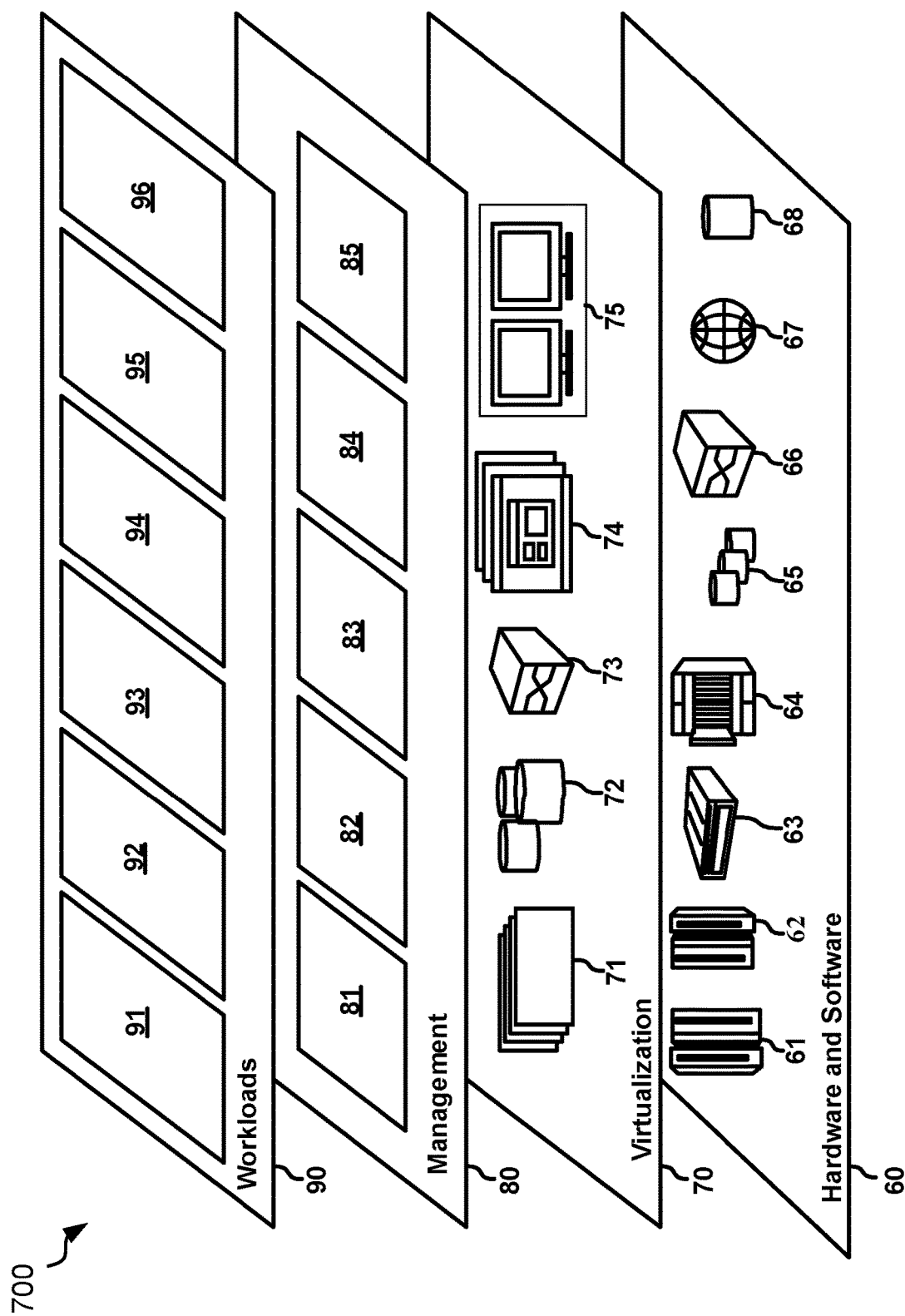
FIG. 7 depicts abstraction model layers, according to some embodiments.

Referring now to FIG. 7, a set of functional abstraction layers 700 provided by cloud computing environment 50 (FIG. 6) is shown, according to some embodiments. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Ops readiness processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electronic signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object orientated program language such as Smalltalk, C++, or the like, and procedural programming languages, such as the "C" programming language or similar programming languages. The computer readable program instructions may execute entirely one the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to some embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving one or more logs of bug tracking information from a client module, wherein the bug tracking information corresponds to one or more applications with one or more production bugs;
   compiling the one or more logs;
   receiving reports of at least Ops issues of the one or more applications and latest requirements of the one or more applications from a company module, wherein the latest requirements include at least current deliverables;
   mapping the compiled one or more logs and the reports;
   generating an Ops readiness score for each of the current deliverables, based on the mapping; and
   generating one or more minimum viable products (MVPs) comprising one or more of the current deliverables, wherein the one or more MVPs are products that include just enough features to achieve a designated function to resolve one or more of the Ops issues, wherein the one or more MVPs are generated using the Ops readiness score, and wherein generating the one or more MVPs comprises:
      determining whether each of the one or more current deliverables has any open dependencies;
      removing any deliverables from the one or more current deliverables with open dependencies from consideration;
      selecting, from a remaining one or more deliverables, the one or more deliverables with a corresponding Ops readiness score indicating high readiness; and
      generating the one or more MVPs comprising at least the selected one or more deliverables.

2. The method of claim 1, further comprising: transmitting the one or more MVPs to one or more stakeholders; receiving, from the one or more stakeholders, one or more approvals of the one or more MVPs; and deploying at least one of the one or more MVPs based on the one or more approvals.

3. The method of claim 2, wherein the one or more MVPs are deployed using at least one of:
   continuous integration, continuous delivery, continuous testing, and other DevOps tools.

4. The method of claim 1, further comprising:
   transmitting the Ops readiness score for one or more of the current deliverables to one or more stakeholders;
   receiving, from the one or more stakeholders, readiness reviews for the one or more current deliverables; and
   determining release content of the one or more current deliverables based on the readiness reviews, wherein the release content comprises at least a priority of which of the one or more current deliverables to release.

5. The method of claim 4, wherein the release content comprises a ranking of the one or more current deliverables in order of the priority.

6. The method of claim 4, wherein the one or more MVPs comprise at least one of the one or more current deliverables based on the Ops readiness score and the release content.

7. The method of claim 1, wherein the bug tracking information comprises at least one of continuous monitoring tool data and user feedback data.

8. The method of claim 1, wherein the compiling and the mapping are executed using a machine learning algorithm.

9. A system having one or more computer processors, the system configured to:
   receive one or more logs of bug tracking information from a client module, wherein the bug tracking information corresponds to one or more applications with one or more production bugs;
   compile the one or more logs;
   receive reports of at least Ops issues of the one or more applications and latest requirements of the one or more applications from a company module, wherein the latest requirements include at least current deliverables;
   map the compiled one or more logs and the reports;
   generate an Ops readiness score for each of the current deliverables, based on the mapping; and
   generating one or more minimum viable products (MVPs) comprising one or more of the current deliverables, wherein the one or more MVPs are products that include just enough features to achieve a designated function to resolve one or more of the Ops issues, wherein the one or more MVPs are generated using the Ops readiness score, and wherein generating the one or more MVPs comprises:
      determining whether each of the one or more current deliverables has any open dependencies;
      removing any deliverables from the one or more current deliverables with open dependencies from consideration;
      selecting, from a remaining one or more deliverables, the one or more deliverables with a corresponding Ops readiness score indicating high readiness; and generating the one or more MVPs comprising at least the selected one or more deliverables.

10. The system of claim 9, further configured to:
transmit the Ops readiness score for one or more of the current deliverables to one or more stakeholders;
receive, from the one or more stakeholders, readiness reviews for the one or more current deliverables; and
determine release content of the one or more current deliverables based on the readiness reviews, wherein the release content comprises at least a priority of which of the one or more current deliverables to release.

11. The system of claim 10, wherein the one or more MVPs comprise at least one of the one or more current deliverables based on the Ops readiness score and the release content.

12. A computer program product comprising a computer readable storage medium having program instructions embodied therewith, the program instructions executable by a server to cause the server to perform a method, the method comprising:
receiving one or more logs of bug tracking information from a client module, wherein the bug tracking information corresponds to one or more applications with one or more production bugs;
compiling the one or more logs;
receiving reports of at least Ops issues of the one or more applications and latest requirements of the one or more applications from a company module, wherein the latest requirements include at least current deliverables;
mapping the compiled one or more logs and the reports;
generating an Ops readiness score for each of the current deliverables, based on the mapping; and
generating one or more minimum viable products (MVPs) comprising one or more of the current deliverables, wherein the one or more MVPs are products that include just enough features to achieve a designated function to resolve one or more of the Ops issues, wherein the one or more MVPs are generated using the Ops readiness score, and wherein generating the one or more MVPs comprises:
determining whether each of the one or more current deliverables has any open dependencies;
removing any deliverables from the one or more current deliverables with open dependencies from consideration;
selecting, from a remaining one or more deliverables, the one or more deliverables with a corresponding Ops readiness score indicating high readiness; and
generating the one or more MVPs comprising at least the selected one or more deliverables.

13. The computer program product of claim 12, further comprising: transmitting the one or more MVPs to one or more stakeholders; receiving, from the one or more stakeholders, one or more approvals of the one or more MVPs; and deploying at least one of the one or more MVPs based on the one or more approvals.

* * * * *